US011773774B2

(12) United States Patent
Menyhart

(10) Patent No.: US 11,773,774 B2
(45) Date of Patent: Oct. 3, 2023

(54) COMBUSTION TURBINE SYSTEM WITH INCREASED PRESSURE RATIO

(71) Applicant: Tivadar Menyhart, Wernberg-Köblitz (DE)

(72) Inventor: Tivadar Menyhart, Wernberg-Köblitz (DE)

(*) Notice: Subject to any disclaimer, the term of this patent is extended or adjusted under 35 U.S.C. 154(b) by 38 days.

(21) Appl. No.: 17/426,526

(22) PCT Filed: Mar. 6, 2020

(86) PCT No.: PCT/DE2020/000048
§ 371 (c)(1),
(2) Date: Jan. 11, 2022

(87) PCT Pub. No.: WO2020/187344
PCT Pub. Date: Sep. 24, 2020

(65) Prior Publication Data
US 2022/0145795 A1    May 12, 2022

(30) Foreign Application Priority Data
Mar. 15, 2019  (DE) ............... 10 2019 001 876.1

(51) Int. Cl.
*F02C 3/20*   (2006.01)
*B60H 1/32*   (2006.01)
(Continued)

(52) U.S. Cl.
CPC ............ *F02C 3/20* (2013.01); *B60H 1/3202* (2013.01); *B60H 3/022* (2013.01); *F01D 15/02* (2013.01);
(Continued)

(58) Field of Classification Search
CPC . F02C 3/20; F02C 6/20; B60H 1/3202; B60H 3/022; B60H 2001/3289; F01D 15/02; F05D 2220/76
See application file for complete search history.

(56) References Cited

U.S. PATENT DOCUMENTS

| 707,634 A | * | 8/1902 | Place | ................. | F17C 3/08 |
| | | | | | 220/560.1 |
| 3,736,745 A | * | 6/1973 | Karig | ................. | F02C 3/34 |
| | | | | | 60/39.52 |

(Continued)

FOREIGN PATENT DOCUMENTS

| DE | 19729077 A1 | 1/1999 |
| DE | 10221191 A1 | 8/2003 |

(Continued)

OTHER PUBLICATIONS

"Liquid Jet Gas Compressor" GEA, https://www.gea.com/en/products/pumps-valves-flow-components/jet-pumps/liquid-jet-gas-type-fgv1.jsp (Year: 2023).*

*Primary Examiner* — Steven M Sutherland
(74) *Attorney, Agent, or Firm* — David Guerra

(57) ABSTRACT

A method, device and system for operating internal combustion engines with an increased pressure ratio and vehicle with this system. Internal combustion engines have a technically restricted pressure ratio, which limits the thermal efficiency. Gas turbines have so far had a maximum pressure ratio of 33:1, diesel engines have compression ratios of up to 23:1. An oxidizer is fed into the combustion chamber in (cold) liquefied condition under very high pressure. The fuel is also supplied in liquid form under high pressure. The pressure ratio of the oxidizer pump is 200, 500 or more. In the combustion chamber, the oxidizer and fuel react and expand to more than a thousand times the liquid volume. Depending on the fuel used, an expansion machine with a (Continued)

pressure ratio of around $\pi=500$ or more or an equivalent expansion ratio of $\varepsilon=85$ or more can be implemented.

4 Claims, 3 Drawing Sheets

(51) Int. Cl.
      *B60H 3/02*         (2006.01)
      *F01D 15/02*      (2006.01)
      *F02C 6/20*        (2006.01)

(52) U.S. Cl.
      CPC ........ *F02C 6/20* (2013.01); *B60H 2001/3289* (2013.01); *F05D 2220/76* (2013.01)

(56) References Cited

U.S. PATENT DOCUMENTS

| | | |
|---|---|---|
| 3,898,794 A | 8/1975 | Ariga |
| 4,354,565 A | 10/1982 | Latter et al. |
| 2012/0134797 A1* | 5/2012 | Higashimori ............ F01D 1/06 |
| | | 415/208.2 |
| 2014/0069090 A1 | 3/2014 | Kaufman et al. |

FOREIGN PATENT DOCUMENTS

| | | | |
|---|---|---|---|
| DE | 102013203044 A1 | 8/2014 | |
| EP | 0677920 A1 * | 10/1995 | ............ F01D 19/00 |
| EP | 0611934 B1 | 9/1998 | |
| FR | 2776018 B1 | 4/2000 | |
| HR | P20020114 B1 | 12/2006 | |
| KR | 20050020448 A | 3/2005 | |
| WO | 2014175765 A1 | 10/2014 | |

\* cited by examiner

COMBUSTION TURBINE SYSTEM WITH INCREASED PRESSURE RATIO

CROSS-REFERENCE TO RELATED APPLICATIONS

This application is an U.S. national phase application under 35 U.S.C. § 371 based upon co-pending International Application No. PCT/DE2020/000048 filed on Mar. 6, 2020. Additionally, this U.S. national phase application claims the benefit of priority of co-pending International Application No. PCT/DE2020/000048 filed on Mar. 6, 2020 and German Application No. 10 2019 001 876.1 filed on Mar. 15, 2019. The entire disclosures of the prior applications are incorporated herein by reference. The international application was published on Sep. 24, 2020 under Publication No. WO 2020/187344 A1.

FIELD OF THE INVENTION

The invention describes a method for operating internal combustion engines, which are particularly suitable as drive units for vehicles, have very low fuel consumption and can meet future exhaust gas limit values.

BACKGROUND

Legislation stipulates increasingly stringent environmental requirements with regard to exhaust gas values and CO2 emissions from vehicles. Conventional internal combustion engines will no longer be able to meet the requirements in the near future.

Alternative propulsion systems are deeply criticized by the public. The fuel cell is very costly due to the platinum catalyst required. The achievable efficiency is put at a maximum of 60%. The required hydrogen can only be produced artificially with a high expenditure of energy and is stored in expensive high-pressure containers. Typically in carbon fiber reinforced containers with a wall thickness of a few centimeters, which today can only be produced using a complex winding process. These take up a lot of space due to the extremely low volumetric energy density of hydrogen. In a 160 l tank, only about 5.5 kg of hydrogen can be stored under 700 bar pressure. That corresponds to the amount of energy of 15.3 kg, or 20.4 liters of gasoline.

Electromobility has been favored as a future technology for a number of years, but has not been able to establish itself despite state funding. Long charging times, a lack of infrastructure, short ranges, especially when the outside temperature is cold, are only bothersome in everyday use. Heat losses through rapid charging, which decimate the overall well-to-wheel efficiency, or self-discharge when stationary are often not mentioned. The environmental pollution caused by the use of heavy metals, rare earths and acids in large quantities is very worrying. The mining of raw materials in often less developed countries under precarious circumstances, the increased energy consumption in production, the disposal after total wear and tear, which can be reached after 4-5 years, to name but a few, cause serious problems in accumulator technology. Overall, a complete battery pack for a car weighs a few hundred kilograms. An electrically powered, fully loaded semi-trailer truck would require at least eight tons of batteries, which would require at least one megawatt of electrical charging power in a fast charging cycle. For such charging capacities on a broad scale, the power grid would first have to be expanded and also supplied with energy. The great technical breakthrough in accumulator technology has been hopefully expected for years.

Combustion engines are known to have poor efficiency levels ($\eta$=fuel calorific value/energy emitted at the shaft). As a rule, this is a maximum of 40-50% for stationary (large) diesel engines. Smaller diesel engines work with a maximum efficiency of 40%, with a compression ratio of at most 23:1. A gasoline engine achieves around 35% efficiency at the optimal operating point, with a compression ratio of at most 15:1. The best (large) gas turbines have an efficiency of 42%, with a pressure ratio of at most 33:1. Small micro gas turbines only achieve 25-30%.

Reference: Richard van Basshuysen, Fred Schafer: Handbuch Verbrennungsmotor. Grundlagen, Komponenten, Systeme, Perspektiven. 3. vollständig überarbeitete und erweiterte Auflage. Friedrich Vieweg & Sohn Verlag/GWV Fachverlage GmbH, Wiesbaden 2005, ISBN 3-528-23933-6

PROBLEM STATEMENT

The thermal efficiency of internal combustion engines is largely determined by the compression or expansion ratio. The greater the expansion ratio, the higher the thermal efficiency. This is true for e.g. the Diesel cycle, the Otto cycle, the Seiliger cycle, the Brayton cycle and the Joule cycle. For this reason, a higher compression or pressure ratio is aimed for in all of the thermodynamic cycles mentioned.

Compression, expansion and pressure ratios are technically linked to one another and cannot easily be separated from one another. A higher compression causes a higher compressor outlet temperature, which in turn leads to a higher combustion temperature. However, this is determined by the thermal stability of the machine and cannot be chosen arbitrarily high. In reciprocating piston engines, the expansion ratio is also limited by the knock limit of the fuel used.

According to the current state of the art, a non-supercharged gasoline engine compresses up to about 15:1. If the diesel engine is not charged, this value is a maximum of 23:1. Supercharged piston engines only work with a significantly reduced compression ratio $\varepsilon$.

Equation: $\varepsilon = 1 + Vh/Vk$ (in which: $Vh$ . . . stroke volume, $Vk$ . . . compression volume)

According to the current state of the art, the compression pressure ratio $\pi$ in a (large) gas turbine is up to 33:1. In aircraft gas turbines, the dynamic pressure at cruising speed is included in the compression pressure ratio, which is why larger values are given there.

Equation: $\pi = p\,\text{end}/p\,\text{suction}$

The relationship between pressure ratio and compression ratio can be described using the following equation:

$\pi = \varepsilon^\kappa$ (in which: $\kappa$ . . . isentropic exponent)

OBJECT OF THE INVENTION

The invention is based on the object of showing an internal combustion engine with a thermodynamic process which has a considerably increased thermal efficiency and thereby lowers the specific fuel consumption and reduces the pollutant emissions. As much of the fuel's calorific value as possible should be converted into mechanical energy. In addition, the invention should show at least one concrete solution in a precisely described machine that can be manufactured inexpensively and environmentally friendly, is characterized by a compact and lightweight design, and can be made from existing technical components and is also suitable for mobile application.

STATE OF THE ART

US 2014/069090 A1 describes a complex, branched system made up of heat exchangers, an active cryogenic cooling system for the working medium and a gas turbine. In every version, the system draws in gaseous combustion air from the environment. Variant 2 (shown in FIG. 2 and in Paragraph 0042) is a non-cryogenic gas turbine system with a classic air compressor with a compression ratio of 5:1. The compressed air is preheated by the exhaust gases from the turbine, enriched with exhaust gas and expanded in a turbine. This is an air-breathing micro gas turbine.

Variants 1 and 3 (FIGS. 1 and 3, Paragraph 0037-0041 and Paragraph 0046-0048) describe how the intake combustion air of a gas turbine is first cooled down by several heat exchangers, then fed to the compressor in a partial flow and then in a partial flow is passed through a cryogenic cooling system and liquefied in the process. The liquefied working fluid can be temporarily stored in a Dewar container for starting the engine and can also be filled from the outside. The partial flows are regulated via a bypass valve. The primary goal here is that the fluid density upstream of the compressor or pump is increased, the compressibility decreases, and the required compression work thus remains minimal. Since the ambient air is not free of moisture, the heat exchangers 118, 318 of the system should tend to freeze, especially in damp weather, which can impair the function up to total failure. The subject of humidity is not dealt with in more detail. In any case, even a thin layer of ice significantly worsens the heat transfer at this point. The heat exchangers would have to overcome a temperature difference of around 220° C. plus the enthalpy of evaporation of the cold liquefied air on the cold side of the system (outside temperature 30° C.→−190° C.). Relatively large, voluminous heat exchangers with additional thermal insulation against ambient heat are therefore essential for good efficiency. These take up valuable installation space in a vehicle, increase the overall weight and drive up costs. The faster the volume flow in a heat exchanger, the larger the volume has to be in order to achieve a high degree of efficiency.

The fact that the partial flows are passed through heat exchangers after compression or pressure increase in a pump and first absorb ambient heat from the fresh gas, then heat from the turbine exhaust gas, excludes the assumption that the working fluid/combustion air enters the combustion chamber in a cold liquid state. However, this would be a very important prerequisite for achieving a pressure ratio of over 200. The turbine inlet temperature is 825° C., the compression pressure ratio 1:20 (Paragraph 0047). If the fluid is expanded in an isentropic turbine, the exhaust gas temperature is consequently at least 400° C., which is passed on directly to the fresh air flow in the recuperator 106 or 306 in order to heat it. The cold liquefied partial flow of the fresh air is already evaporated in the recuperator 106, 306 or in the heat exchanger 118, 318. In variant 3, in a partial flow, even uncooled exhaust gas is fed back into the fresh air flow via a valve and a suction jet pump. An exceptionally large pressure ratio/large combustion chamber pressure is not mentioned here. It is even pointed out several times that a low turbine pressure ratio is sought.

Overall, the system described here runs through a cycle that operates at a significantly lower pressure and temperature level. As a result, a considerably smaller area is included in the temperature-entropy diagram, which indicates a poorer efficiency. A significant part of the area does not do any work, as only heat is recuperated there. A closer evaluation of the cyclic process suggests an ideally reversible efficiency of a maximum of 60%. If the air flow on the inlet side is not 100% liquefied, but is throttled via bypass valve 122 or 322 and takes the "shortcut" to the compressor, the required drive energy for compressor 120 or 318 increases and the efficiency of the system falls far below 60%.

Since braking energy, solar energy or airflow produced during driving is used to drive and maintain the cryogenic cooling system, it can be assumed that a vehicle with this system would only achieve relatively poor efficiencies of well below 60% under unfavorable conditions, e.g. on a motorway trip at night, without solar energy, at a constant speed, at which almost no braking energy is lost.

Variant 4 (FIG. 4) describes a change-over system that allows the entire Dewar container, which houses the frozen cooling medium, nitrogen ice, to be exchanged. Used nitrogen ice can be refilled by replacing the complete Dewar container, which is not infrequently the case under the unfavorable conditions described above (long motorway drive, darkness). Exchange stations for refillable Dewar containers as exchangeable goods should in principle be available at every petrol station. A change-over system for vehicle batteries has already met with little acceptance. Financing of the replacement container, warehousing, expensive automated robot systems that enable a quick and clean change and, last but not least, the more difficult vehicle integration taking into account e.g. Crash safety speak against such a change-over system.

If a vehicle with this system is parked in a garage for several days, the cooling medium melts and evaporates in a Dewar container due to latent ambient heat. Then the excess nitrogen gas must be released into the environment in a controlled manner (keyword: blow-off). This is particularly problematic in closed rooms, such as underground car parks, since an increased concentration of nitrogen in breathing air has a toxic effect. The document does not deal with this either.

Systems for the intermediate storage of energy by means of cold liquefied air are already known. DE102013203044A1 e.g. describes an air-breathing, stationary gas turbine unit, which comprises an air compressor and a gas turbine in all the variants described. The output of the turbine is regulated or increased by adding liquid air to the compression procedure. The liquid air is not injected directly into the combustion chamber, but is either injected into the front of the intake device or directly into the air compressor. In both cases, the liquid air mixes with the sucked in air, which in principle excludes 100% liquid air supply. In any case, from an energetic point of view, it would not make sense to allow the 100% injected liquid air to evaporate in a vacuum before, or in the compressor, in this case when the turbine is running, in order to then compress it again with great energy expenditure. This measure essentially causes the sucked in, compressed air to cool down and thereby increases the mass flow or lowers the compressor outlet temperature. The state of aggregation of the liquid air changes to "gaseous" long before it reaches the combustion chamber. The higher fresh air density causes a somewhat higher compressor pressure ratio, which is achieved solely by cooling the fresh air. The achievable increase in efficiency is relatively moderate. A variable pressure ratio of the turbine on the outlet side—which would be necessary for a significantly higher degree of efficiency—is not mentioned here.

A vehicle propulsion system by means of cold liquefied air is described e.g. in U.S. Pat. No. 4,354,565. The stored energy is generated from liquid air or liquid nitrogen. The oxidizer or the non-flammable working gas (nitrogen) is passed through a chain of heat exchangers before being introduced into the first working chamber. Here, the liquid air/nitrogen is heated, absorbs energy and immediately enters the supercritical state under 200 bar process pressure. The state of aggregation changes from "liquid" to "supercritical" before reaching the working chamber/combustion chamber, namely in the heat exchanger, and is evaporated or pseudo-evaporated. Although thermal energy from the environment or waste heat from the vehicle is used here, part of the volume change work in the heat exchanger is lost, or the heat exchanger itself causes a considerable drop in pressure. Such a heat exchanger system in a vehicle would be complex, heavy and expensive due to the high process pressures and the branches/linkages—due to the large wall thicknesses of the heat exchangers with a system pressure of 200 bar, plus the safety regulations for high pressure components. Problems arise from the icing up of the heat exchangers, air condensation and the oxygen enrichment in cryogenic heat exchangers. In addition, the large dead volume has an extremely sluggish effect and is therefore extremely difficult to represent technically in a dynamic system that should respond as directly as possible when the driver requests performance. The thermal inertia and the need for thermal energy from the environment require large heat exchangers on the one hand—especially when the outside temperature is cold. On the other hand, gas-carrying volumes of a dynamic system must be designed as compact as possible and have low flow resistance, similar to the charge air and exhaust gas routing paths of supercharged engines. In order to achieve a reasonable range, the liquid air tank or nitrogen tank including its contents would be disproportionately heavy and large.

U.S. Pat. No. 3,736,745 A describes a closed system based on the supercritical CO2 Brayton cycle with recirculation of the combustion products, which represent the working fluid. The working fluid consists largely of liquid/supercritical CO2 and water. The working fluid can optionally also be temporarily stored and is fed to the combustion chamber in a supercritical state, that is to say in gaseous form, under 200 bar pressure, with high density. The oxidizer (pure oxygen) is supplied from a bottle, also in gaseous form. To ensure that the working fluid is liquefied before it is pumped up to injection pressure, efficient, pressure-resistant heat exchangers for recooling with an operating pressure of between 100 and 200 bar are required. The working fluid is blown into the combustion chamber along with relatively little oxidizer and fuel. During combustion, the fluid only heats up by about 160K. Then it relaxes in the single-stage turbine with a very low pressure ratio of around $\pi=2$. In the document, an overall thermal efficiency of approx. 42% is specified, which is now also achieved by smaller diesel engines. The specific technical work is only approx. 130 kJ/kg. The machine can be made more compact than a steam turbine, which primarily results from the high fluid density (approx. 90-100 kg/m$^3$).

A similar system is known from FR 2776018 A1, which was intended as a submarine drive or ship drive. This is also a partially open system with condensate return to the combustion process. Condensed water vapor is extracted from the exhaust gas and injected back into the combustion chamber as liquid water (250-300° C.). In diving mode, the system is fed with cold liquefied oxygen or pressurized oxygen from an on-board tank. Optionally, ambient air can also be sucked in at the water surface. The combustion chamber pressure is approx. 15-20 bar, so the pressure ratio of the power turbine can be at most $\pi=15$. The clear advantage of the system is that it can be operated underwater without an air snorkel and the low waste heat signature, which is important in the military sector, and which is achieved through heat recovery from the combustion products. Here, the efficiency is unlikely to exceed 42%, too. The necessary heat exchangers also make this system complex, cost-intensive and heavy.

DETAILED DESCRIPTION

In the following, the term "oxidizer" is mainly used for all chemical compounds or mixtures that can oxidize other substances, i.e. are able to release oxygen atoms. LAIR stands for "liquid air". LOX stands for "liquid oxygen".

In the following, the terms "cryogenic", "cold liquefied", "cold liquid", "cryogenic" are applied to gases whose boiling temperature is far below the ambient temperature. Liquid air, for example, has a boiling temperature of approx. $-190°$ C.

In the following, the term "turbine" is used for an expansion machine with a rotor that does not have a compressor, is operated with a (cold) liquid oxidizer and has a pressure ratio of at least $\pi=200$.

In the following, the term "turbo-electric drive" known from the literature is used for the unit consisting of a turbine that drives a generator mechanically via the turbine shaft or via an intermediate gear, and the electric drive motor (s) of a vehicle.

The term "gas turbine" is used in the following for turbines in the 'classic sense', i.e. air breathing machines with a compressor and a pressure ratio of up to about $\pi=35$.

BRIEF DESCRIPTION OF THE DRAWINGS

(FIG. 1 and FIG. 2) EXAMPLE in the T-s diagram, respectively in the p-V diagram of Air.
Explanation of the Changes in State.

Figure 1:
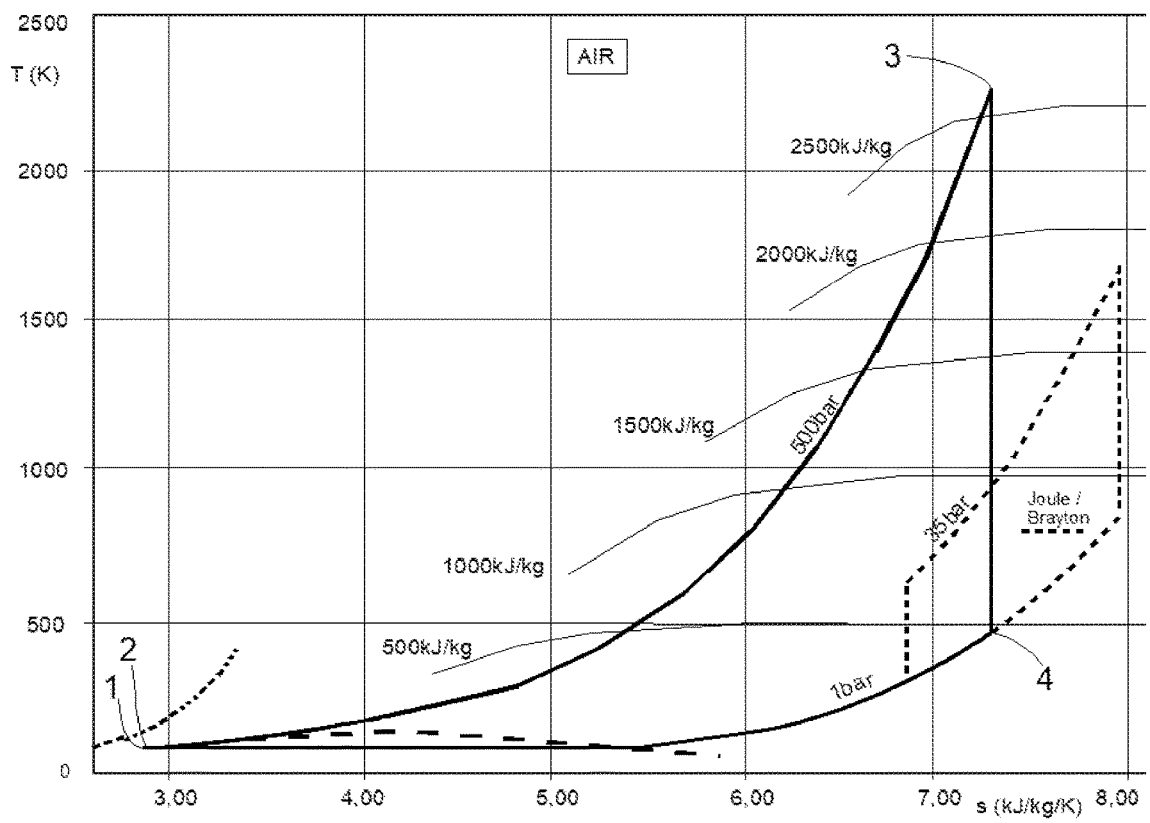
FIG. 1 shows the cycle described here as a clockwise thermodynamic cycle in the T-s diagram. An ideal Joule cycle (dashed line) is given as a comparison.

1-2 Isentropic Compression
The pressure of the cold liquid oxidizer is increased from p1=1 bar to p2=500 bar by a liquid pump
The temperature is increased from T1=80K to T2=91K
Supply of the specific compression work wt12=60 kJ/kg
The specific entropy remains constant
The specific volume decreases from V1=1.15×10$^{-3}$ m$^3$/kg to V2=1.08×10$^{-3}$ m$^3$/kg 2-3 Isobaric Combustion
The combustion takes place continuously in a flame zone
No pressure change
The temperature rises from T2=91K to T3=2250K Heat supply q23=2750 kJ/kg The specific entropy increases from s2=2.8 kJ/kg/K to s3=7.3 kJ/kg/K The specific volume increases from V2=1.08×10$^{-3}$ m$^3$/kg to V3=1.35×10$^{-2}$ m$^3$/kg 3-4 Isentropic Expansion Expansion in a turbine The pressure relaxes from p3=500 bar to p4=1 bar The temperature drops from T3=2250K to T4=466K Withdrawal of turbine work wt34=−2208 kJ/kg The specific entropy remains constant The specific volume increases from V3=1.35×10$^{-2}$ m$^3$/kg to V4=1.38 m$^3$/kg 4-1 Isobaric Heat Removal The gas is released into the environment Removal of specific heat q41=−608 kJ/kg The invention proposes a clockwise cycle (FIG. 1, FIG. 2) in which the oxidizer (in this example air) is supplied in a cold liquefied state. This eliminates the compression cycle. Instead, the liquid oxidizer is brought to the injection pressure below its critical temperature and injected into the combustion chamber. Under real conditions, the injection pressure must be higher than the combustion pressure in order to overcome it.

Compared to the classic cyclic processes from thermodynamics, the exhaust gas temperature is a few hundred Kelvin (4) lower. The graph shows that the useful work (area within 1-2-3-4-1) is very large in relation to the amount of heat dissipated. The ideal thermal efficiency is over 80%. The specific useful work is about 4 times as large as in a comparable Joule/Brayton cycle. Equation: η=W eff/Q supp (in which: η . . . efficiency; W eff . . . effective work; Q supp . . . supplied heat)

All oxygen carriers that can be stored in the cold liquefied state or in the liquid state at standard temperature, even under increased pressure, are suitable as oxidizers. This includes, for example, liquid oxygen (LOX) or oxygen-enriched, cold-liquefied air. Cold liquefied air (LAIR) with natural oxygen, nitrogen and argon components is particularly suitable, as it is non-toxic and does not pose a direct risk to the environment if it escapes in low doses. In addition, it can be obtained anywhere from the ambient air and produced inexpensively.

The oxidizer (11) can be stored in a vacuum-insulated vessel (35). These are double-walled—similar to a thermos flask—and shielded against radiation so that the stored liquid remains cold for as long as possible. A daily evaporation rate of 1% of the content is unavoidable due to heating. Small amounts of evaporation can be released into the environment without danger. Typically, cold liquefied air is stored at approx. −190° C. (80K) under a maximum tank pressure of 5 bar. Refueling can be done without pressure via a well insulated hose.

A major advantage of using liquid air instead of liquid oxygen is the greater mass throughput when a turbine is used. (Equation: Q=Wt×m; in which: Q . . . heat quantity; Wt . . . technical work; m . . . mass). Higher mass throughput results in more useful energy. 1 kg of gasoline requires around 14.7 kg of liquid air for stoichiometric combustion. When burning gasoline with pure oxygen (O2), the ratio would be around 1 kg gasoline to 3.5 kg oxygen.

Another advantage of a turbine is that there are no push-in and push-out losses due to gas exchange. There is also no compression work that needs to be done. Only relatively small losses are to be expected, which result from pressure loss in the injection device, efficiency of the oxidizer pump (s), combustion chamber efficiency and turbine efficiency.

Far less energy is required to pump the oxidizer in the (cold) liquid phase to a higher pressure level than to compress it in the gas phase. In contrast to gases, liquids are almost incompressible and hardly heat up with isentropic pressure increases. The isentropic pressure increase of cold liquefied air from 1 to 500 bar causes a temperature increase of about 11 Kelvin. The density of the fluid increases by about 7%. The proportion of drive energy required for the injection pump (s) is wastefully small. In a conventional gas turbine, which sucks in air in a stoichiometric ratio and compresses it, around 33% of the mechanical shaft energy is lost as drive energy for the compressor. It is known that gas turbines have to suck in and compress more air than required stoichiometrically in order to ensure internal cooling of the combustion chamber and the turbine.

The push-in work and the compression work that occurs in a conventional reciprocating piston engine or a gas turbine in the gaseous state of aggregation do not have to be performed. The compression work is done, e. g. in a stationary air liquefaction plant with a much higher efficiency. In a power plant, electricity can mainly be used at night in the cheap electricity phase when there is already overproduction. The resulting pressure energy is stored in the oxidizer (e.g. cold liquefied air). During the combustion in the combustion chamber, a large part of this pressure energy is released again. If the oxidizer is kept in the liquid state until it enters the combustion chamber, i.e. below the critical temperature, the flow rate remains low. As a result, throttle and flow losses also remain low. The insertion work required when injecting into the combustion chamber is extremely small due to the low specific volume. Equation: W=p×V (in which: W . . . work; p . . . pressure; V . . . volume)

The oxidizer (11) releases its energy together with the fuel after ignition in the combustion chamber (15). The combustion temperature can be around 2000-2400K, depending on the fuel used, if cold liquefied air is used as the oxidizer. If oxygen (O2) is used, the combustion temperatures are considerably higher. The fuel can be supplied in liquid or gaseous form. For adiabatic compression, however, gases require more energy than liquids, which are almost incompressible. Since relatively little fuel is needed in relation to the oxidizer, the losses are manageable. The combustion pressure is at least 200 bar, better 500 bar, or more.

The combustion of a cold liquefied oxidizer in a high pressure combustion chamber results in two effects that affect the combustion temperature. On the one hand, the cold liquefied oxidizer causes a reduction; on the other hand, the high pressure causes an increase in the combustion temperature—compared to the calculated adiabatic combustion temperature under standard conditions. This is due to the higher reactivity of the molecules under pressure.

(FIG. 3) The combustion chamber (15) has a very similar structure to the combustion chamber of a liquid rocket. Rocket combustion chambers achieve efficiencies of 95%-99.5%. This is due to the good distribution, mixing and turbulence of the combustion gases. The injection plate (15b) consists of several interconnected perforated disks. At the same time, it represents the cover plate of the cylindrical combustion chamber and injects fuel and oxidizer over a large area through many small holes over its entire surface.

(FIG. 3, FIG. 4) Then the expansion takes place in a turbine (16) with a pressure ratio of at least π=200, better π=500 or higher. This dispenses with a compressor and would have to be optimized for processing solely a cryogenic liquefied oxidizer (11) and a fuel (12). Compressorless turbines are commonly referred to as expansion turbines or turboexpanders. These usually have a total pressure ratio of at most n=25.

Last generation turbo expanders have a single stage with a pressure ratio of 25 and more. In order to achieve such a ratio with the best possible degree of efficiency, the flow is accelerated in a nozzle to 1.5 to 2.5 times the speed of sound before entering the turbine. See WO002014175765A1. Two stages with n=25 in series would already result in a total pressure ratio of π total=625. The required total pressure ratio can be achieved in a compact machine with only two turbine stages and good efficiency. Equation: π total=π1×π2

Figure 3:
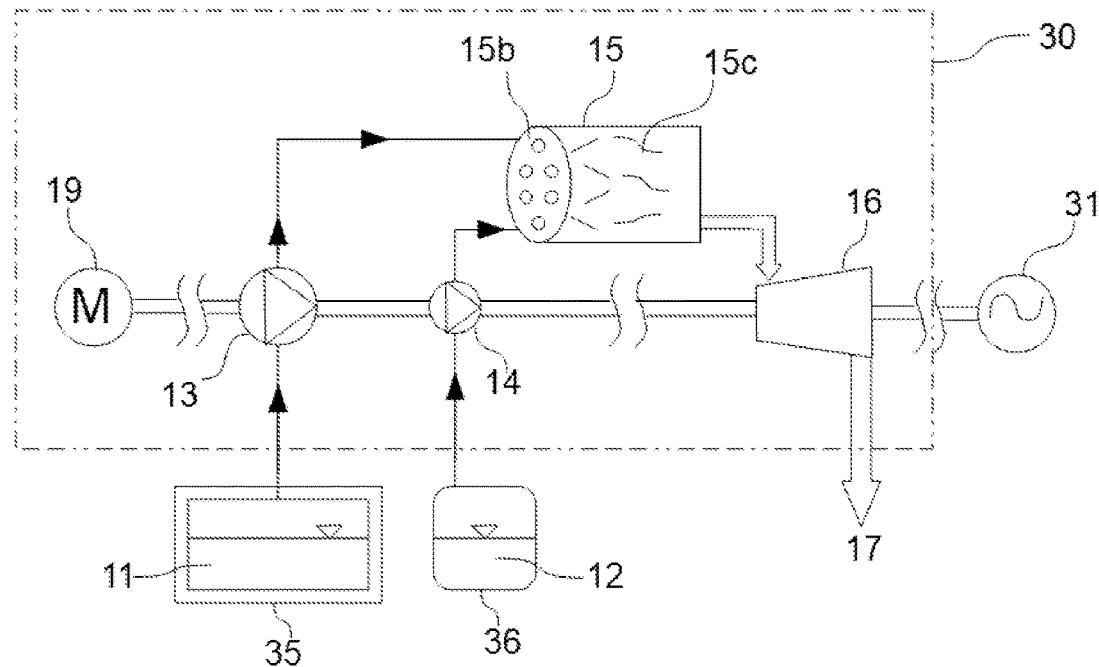
FIG. 3 shows the system of a turbo-electric machine with a turbine, which works according to the method of FIG. 1 and FIG. 2.
Figure 4:
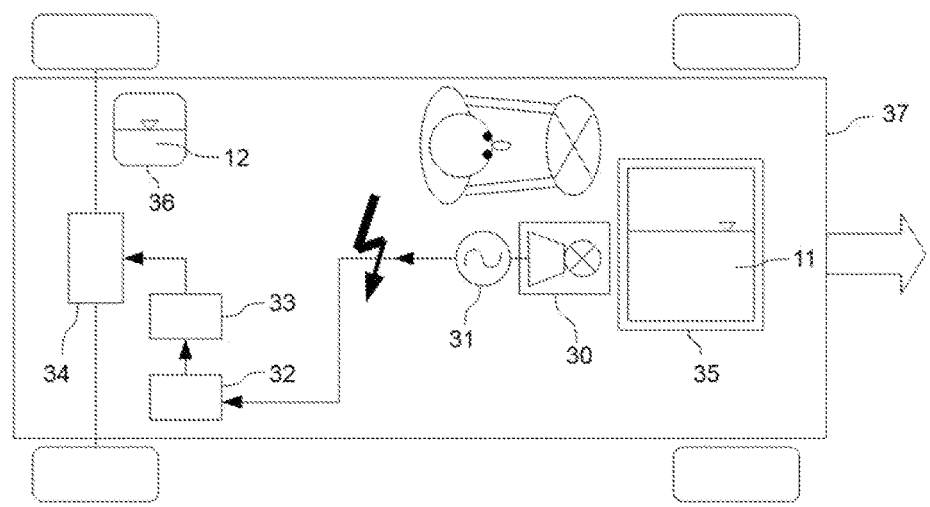
FIG. 4 shows the schematic structure of a vehicle that is powered by the turbo-electric drive system from FIG. 3.

Such a turbine can easily be coupled to an electric machine (e.g. a high-frequency generator) (FIG. 3). Compare 'turbo-electric drive' in locomotives and large ships. The polarity of this generator (31) can be reversed during start-up operation or, if required, in an electric motor operating state and thus drive the turbine if required. After voltage-/frequency conversion (32), the electrical current generated in this way can be temporarily stored in an accumulator (33) or in capacitor(s) before the electrical current is passed to the drive machine(s). In such a combination, braking energy recuperation is also possible. The current can also be sent directly to the electric drive motor(s) (34). The turbine can thus be kept at an optimized operating point for the highest possible efficiency.

Since the fresh gas volume and the turbine speed are not related to one another, as is the case with the single-shaft turbine, the dynamics are very high. The machine takes less time to reach a desired load point. In addition, the connected generator can be polarized as an electric motor when starting up or if necessary (for boosting).

(FIG. 4) The weight of a 100 kW turbine should be well below 10 kg and have a gross volume of less than 10 liters, including auxiliaries. In general, size and weight are comparable to an exhaust gas turbocharger in today's cars or trucks, also in terms of manufacturing costs. In this way, the turbine can easily be placed in a car where the transmission tunnel is today. The large vacuum-insulated vessel (35) for the oxidizer can be placed in the front of the vehicle.

A turbine inlet temperature of 2400K is a bit too high according to the current state of the art. The materials used cannot withstand such high temperatures over the long term. Up to 1900K are common in large gas turbines with curtain or film cooling. Therefore, four possible approaches are proposed.

Variant 1: The turbine is operated with an excess of oxidizer, approximately with λ=1.2 to λ=1.7. Comparable to the curtain or film cooling in a gas turbine, additional air is supplied to the combustion chamber walls and turbine stator/rotor. The consumption compared to a stoichiometric combustion would be increased accordingly. The disadvantage of the lower turbine inlet temperature is roughly offset by the advantage of the increased mass throughput. The specific useful work is therefore approximately retained.

Variant 2: Additional water is injected into the turbine with the aim of cooling (similar to variant 1). The water required for this can be recovered from the exhaust gas. Every time it is burned, a not inconsiderable amount of water is produced anyway. Example: Gasoline-air in the stoichiometric ratio results in approx. 8% water vapor in the exhaust gas. Due to the principle-related low exhaust gas temperature, condensed water could be recovered from the exhaust gas tract, possibly with the help of heat exchangers.

Variant 3: The turbine is operated in two stages with a high and low pressure section. After the isentropic expansion in the high-pressure part, the combustion gas is passed past the outer wall of the combustion chamber or passed into a heat exchanger and will be reheated there. The heat exchanger can be fed from the combustion chamber or the stator(s). This leads to a lower turbine inlet temperature upstream of the high-pressure turbine and a higher turbine inlet temperature upstream of the low-pressure turbine. As a result of the reheating (compare Clausius-Rankine cycle), the overall efficiency drops only slightly. The pressure loss in the heat exchanger and the longer gas paths have a negative effect.

Variant 4: High temperature-resistant composite materials with very low thermal expansion are already being used in rocket engines in the nozzle neck area. For the next generation of gas turbine blades, a fatigue strength of up to 2000K could be achieved in the coming years through the use of ceramic matrix composites. These could be used in places that are particularly exposed to high temperatures, such as combustion chamber walls and the first turbine stage. The cost factor is minor, as the affected parts are much smaller. The turbine runner of a 100 kW turbine is estimated to be a few centimeters in diameter.

The high combustion temperature (3) is seen as an opportunity, as a result of which almost flameless combustion can be achieved. The formation of nitrogen oxide (NOX), for example, can be largely suppressed. The combustion is cleaner and more complete.

Figure 2:
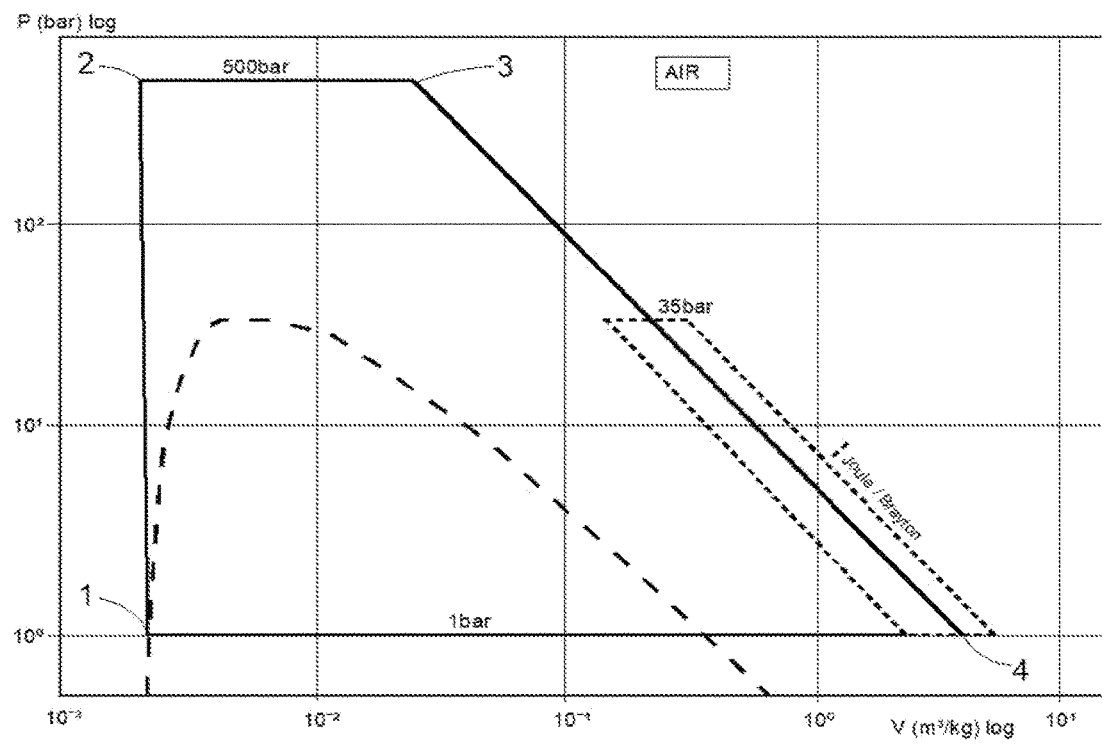
FIG. 2 shows the cycle described as a clockwise thermodynamic cycle in a p-V diagram. The ideal Joule cycle (dashed line) is given as a comparison.

Due to the high pressure ratio the exhaust gases are cooled down to a turbine outlet temperature (4) of about 400-500K, which is unusually low for internal combustion engines (FIG. 1). There are extremely low thermal losses. The residual heat in the exhaust gas can still be used to partially or completely heat up the passenger compartment in winter.

Due to the high efficiency, the combustion of natural gas (consists mainly of methane), hydrogen or a mixture of both (hythane) could prevail alongside conventional gasoline or diesel fuel. In all cases, a significantly smaller pressure vessel would be required for the same range. So far, fuel cell vehicles have not caught on mainly because of the high manufacturing costs. The pressure tank has a large share of the manufacturing costs. The hydrogen consumption would decrease by at least 30% compared to the fuel cell.

The fuel consumption of a turbo-electric drive system with a turbine was compared with a turbo-gasoline engine (car) and a turbo-diesel engine (car) of the latest generation. Fuel consumption and CO2 emissions could be reduced by 50-65%. This corresponds to a realistic gasoline consumption of around 1.85-2.1 kg and a liquid air consumption of 28-32 kg in a mid-range vehicle with a running weight of 1500-1700 kg. As a result, that's around 57-66g CO2 emissions per km in the vehicle. The energy consumption for the production of 1 kg of liquid air in a large power plant is around 300 Wh/kg.

Further Advantage: Air Conditioning with Liquid Air

A secondary, but not insignificant, advantage when using cold liquefied air as an oxidizer in the above-described method in a vehicle is the possibility of air conditioning the interior with little effort.

The task is to present a system that is used to cool the passenger compartment. It should be possible to achieve this with little technical effort, low weight and compact dimensions. In addition, it should require little drive energy, manage without the use of a refrigerant and also be able to be operated when stationary. To solve this problem, a method according to claim 2 is shown.

There is a need for cooling in a vehicle in the summer, which is conventionally provided by a condensation air conditioning system with poor efficiency. A drive power of 4-6 kW is typical for an air conditioning compressor. On average, however, only around 0.25 kW cooling capacity is required in a car. Such cooling is ensured by the evaporation of approx. 2.5-3 liters of cold liquefied air per hour.

Open or closed evaporation systems operated with water are known, e.g. from DE10221191A1 and DE19729077A1. However, water cannot provide the cooling energy of cold liquefied air by far. In addition, an open system increases the humidity in the cooled room and thus worsens the well-being of the passengers.

Closed cryogenic systems that are operated in a closed circuit, especially filled with nitrogen, are also known, e.g. EP611934B1. However, such a system is complex and requires drive energy for at least one (refrigeration) compressor. All closed systems that are operated in the reverse Rankine cycle require mechanical drive energy, which is usually provided by an internal combustion engine. The overall efficiency is relatively poor due to the long efficiency chain (combustion engine—mechanical drive—refrigerant compressor—evaporator—heat exchanger). This means that an above average amount of energy is required for cooling. The additional pollutant emissions/CO2 emissions are high.

KR102005020448A shows the atomization of cold liquefied nitrogen in a parked vehicle in summer. The disadvantage of pure nitrogen in an almost closed passenger compartment is that if it is enriched in the air it can lead to hypoxia and, in the worst case, to death from asphyxiation. Therefore, such a system can only deliver higher amounts of the coolant into the interior when there are no people or animals in the passenger compartment. Ventilation must be provided before entry.

Figure 5:
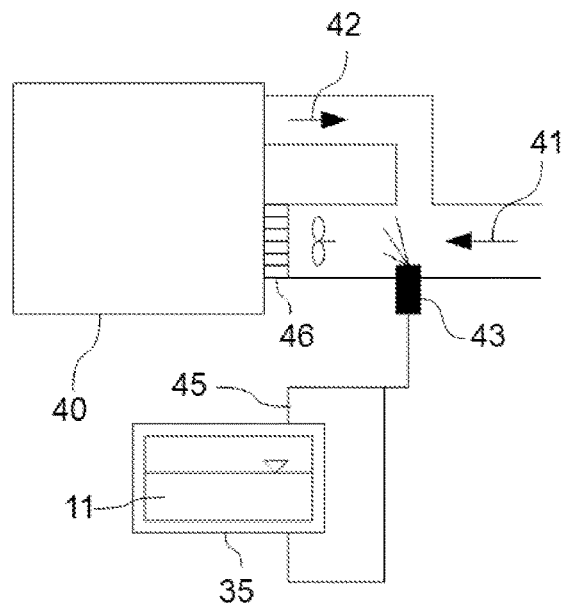
FIG. 5 shows the general structure of a passenger compartment air conditioning with atomized cryogenic liquid air.
Figure 6:
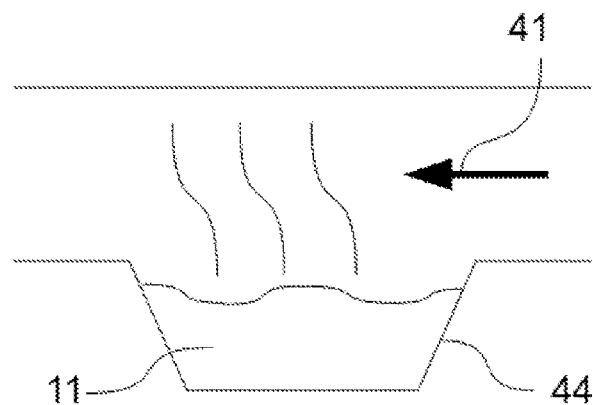
FIG. 6 shows the general structure of an evaporation container for cryogenic liquid air.

(FIG. 5, FIG. 6) At summer temperatures it is proposed to enrich the outside air supply (41) or the circulating air (42) for the interior with cold liquefied air (11) supplied from the vacuum-insulated vessel (35). This can be done by atomization (43) or spraying of the liquid air. Alternatively, the targeted evaporation in an evaporation container (44), over a surface wetted with liquid air, or a moistened membrane can be used for cooling. As an alternative or in addition to the liquid supply, the amount of evaporation that is generated in the vacuum-insulated vessel anyway due to insulation losses can be fed (45) into the passenger compartment in a metered manner. In both cases, it would make sense to filter the gaseous air produced in this way, for example in a (activated carbon) filter (46), before it is fed into the interior. Such a system does not require any high pressure compressors or pumps. Under certain circumstances, the overpressure of the vacuum-insulated container alone is sufficient to convey and atomize the required cold-liquefied air. A small delivery pump ensures the delivery rate in any case.

Some aspects of the present technology can include a method for generating energy from a liquid oxidizer and a liquid or gaseous fuel in a turbo-electric system, characterized in that:

1.1) only liquid oxidizer (11) serves as oxidizer in the turbine system for the combustion process, this being in liquid form via the injection plate (15*b*) directly into the combustion chamber (15) of the turbine (16), 1.2) instead of the compression phase, the oxidizer is pressurized in liquid form in a pump (13), 1.3) the oxidizer only evaporates in the combustion chamber (15), then is burned together with the fuel, the oxidizer being brought to the injection pressure below its critical temperature and injected into the combustion chamber, 1.4) the combustion gases (15*c*) are expanded with a total pressure ratio of 200 or more ($\pi >> 200$) in a turbine (16), 1.5) the mechanical shaft energy is delivered from the turbine to a generator (31), which can also be switched to electric motor operation, 1.6) the electrical current from the generator is converted as required (32) and 1.7) the electrical current with or without intermediate storage (33) is passed on to the electric drive motor(s) (34).

Wherein the device for performing a method according to the above, consisting of:

2.1) a vacuum-insulated vessel (35) for storing the oxidizer (11), 2.2) a suitable vessel (36) for storing the fuel (12), 2.3) an oxidizer pump (13), which is arranged downstream of the vacuum-insulated vessel, with connection to the turbine, or with connection to its own electric motor (19), 2.4) a fuel pump (14), which is arranged downstream of the fuel vessel, with a connection to the turbine, or with a connection to its own electric motor (19), 2.5) a combustion chamber (15), with the injection plate (15*b*) located therein, with connection to the oxidizer pump and connection to the fuel pump, 2.6) a turbine (16) which is arranged downstream of the combustion chamber, 2.7) a generator (31), with connection to the turbine, 2.8) a voltage/frequency converter (32), which is arranged downstream of the generator and 2.9) an accumulator (33) or capacitor(s) for electrical current.

Wherein a vehicle with a device according to the above, which is part of the drive unit, consisting of:

3.1) a device according to the above for generating drive energy and 3.2) the electric drive motor(s) (34).

Wherein the vehicle according to the above with a device for cooling the passenger compartment, characterized in that:

4.1) a small amount of cold liquefied air (11) is removed from the vacuum-insulated vessel (35) in order to cool the passenger compartment (40) and 4.2) the admixture to the fresh air (41) or to the circulating air (42) can take place via an atomizer (43), via an evaporation container (44), a nebulizer, via a surface wetted with liquid, or via a membrane.

REFERENCE SIGNS

11 Oxidizer
12 Fuel
13 Oxidizer Pump
14 Fuel Pump
15 Combustion Chamber
15*b* Injection Plate
15*c* Combustion Gases
16 Turbine
17 Exhaust Gas
19 Electric Motor for Pump(s)
30 Turbine System
31 Generator
32 Voltage-/Frequency Converter
33 Accumulator or Capacitor
34 Electric Drive Motor
35 Vessel for Oxidizer
36 Vessel for Fuel
37 Vehicle
40 Passenger Compartment
41 Fresh Air 42 Circulating Air
43 Atomizer
44 Evaporation Tray
45 Feed Line
46 Filter

The invention claimed is:

1. A method for generating energy from a liquid oxidizer and a liquid or gaseous fuel in a turbo-electric system, wherein the method comprising the steps of:
   providing only liquid oxidizer as an oxidizer in a turbine system for a combustion process, injecting the oxidizer in liquid form from an oxidizer pump directly into a combustion chamber of a turbine:
   pressurizing the oxidizer in liquid form in the oxidizer pump instead of in a compression phase;
   evaporating the oxidizer only in the combustion chamber, then the oxidizer is burned together with the liquid of gaseous fuel, the oxidizer being brought to an injection pressure below the critical temperature of the oxidizer and injected into the combustion chamber;
   expanding combustion gases with a total pressure ratio of 200 or more ($\pi \gg 200$) in the turbine;
   delivering mechanical shaft energy from the turbine to a generator, wherein the generator is capable of being switched to an electric motor operation to drive the turbine in a startup operation;
   converting electrical current from the generator as required; and
   passing the electrical current on directly from the generator.

2. A device for performing the method according to claim 1 the device comprising:
   a vacuum-insulated vessel for storing the oxidizer;
   a fuel vessel for storing the liquid of gaseous fuel;
   wherein the oxidizer pump, which is arranged downstream of the vacuum-insulated vessel, with connection to the turbine, or with connection to an electric motor of the oxidizer pump;
   a fuel pump, which is arranged downstream of the fuel vessel, with a connection to the turbine, or with a connection to an electric motor of the fuel pump;
   the combustion chamber, with an injection plate located therein, with connection to the oxidizer pump and connection to the fuel pump;
   the turbine, which is arranged downstream of the combustion chamber;
   the generator, with connection to the turbine;
   a voltage/frequency converter, which is arranged downstream of the generator; and
   wherein an intermediate storage being an accumulator or capacitor for the electrical current, the intermediate storage being arranged downstream of the voltage/frequency converter.

3. A vehicle with the device according to claim 2, which is part of a drive unit, the vehicle comprising:
   the device from claim 2 for generating drive energy; and
   an electric drive motor.

4. The vehicle according to claim 3 with a device for cooling a passenger compartment, wherein an amount of cold liquefied air is removed from the vacuum-insulated vessel in order to cool the passenger compartment, and an admixture to fresh air or to circulating air takes place via an atomizer, via an evaporation container, a nebulizer, via a surface wetted with liquid, or via a membrane.

* * * * *

UNITED STATES PATENT AND TRADEMARK OFFICE
CERTIFICATE OF CORRECTION

PATENT NO. : 11,773,774 B2
APPLICATION NO. : 17/426526
DATED : October 3, 2023
INVENTOR(S) : Tivadar Menyhart It is certified that error appears in the above-identified patent and that said Letters Patent is hereby corrected as shown below:

In the Claims

In Claim 1, Lines 11-12 (Column 13, Lines 18-19), the phrase "liquid of gaseous fuel" should read "liquid or gaseous fuel".

In Claim 2, Line 4 (Column 14, Line 2), the phrase "liquid of gaseous fuel" should read "liquid or gaseous fuel".

Signed and Sealed this
Fifth Day of November, 2024

Katherine Kelly Vidal
*Director of the United States Patent and Trademark Office*